United States Patent
Haas et al.

(10) Patent No.: US 11,390,390 B2
(45) Date of Patent: Jul. 19, 2022

(54) EJECTION SEAT SEQUENCE START SYSTEMS AND METHODS

(71) Applicant: AMI Industries, Inc., Colorado Springs, CO (US)

(72) Inventors: Ian Walter Haas, Colorado Springs, CO (US); Kassidy L. Carson, Colorado Springs, CO (US); Neil Cross, Peyton, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 116 days.

(21) Appl. No.: 17/035,526

(22) Filed: Sep. 28, 2020

(65) Prior Publication Data
US 2022/0097857 A1   Mar. 31, 2022

(51) Int. Cl.
*B64D 25/10*   (2006.01)

(52) U.S. Cl.
CPC .................................... *B64D 25/10* (2013.01)

(58) Field of Classification Search
CPC ..................................................... B64D 25/10
See application file for complete search history.

(56) References Cited

U.S. PATENT DOCUMENTS

| | | | | |
|---|---|---|---|---|
| 3,740,005 A * | 6/1973 | Rivers | ............... | B64D 25/10 244/122 AD |
| 4,792,903 A * | 12/1988 | Peck | ............... | B64D 25/10 244/122 A |
| 4,846,421 A * | 7/1989 | Trikha | ............... | B64D 25/10 244/141 |
| 4,911,382 A * | 3/1990 | Aronne | ............... | B64D 25/10 307/118 |
| 5,222,695 A * | 6/1993 | Lake | ............... | B64D 25/10 244/122 AE |
| 5,525,847 A * | 6/1996 | Aronne | ............... | B64D 25/10 307/43 |
| 5,894,285 A * | 4/1999 | Yee | ............... | B64D 25/10 701/515 |
| 2019/0295433 A1 | 9/2019 | Tse | | |

* cited by examiner

*Primary Examiner* — Richard G Davis
(74) *Attorney, Agent, or Firm* — Snell & Wilmer L.L.P.

(57) ABSTRACT

An aircraft ejection seat sequence may comprise: a sequence controller; a sensor target; and a non-contact sensor in electrical communication with the sequence controller, the non-contact sensor configured to transmit a reference control signal to the sequence controller in response to sensing the sensor target.

20 Claims, 4 Drawing Sheets

EJECTION SEAT SEQUENCE START SYSTEMS AND METHODS

FIELD

The present disclosure relates to escape systems, and more specifically, to ejection seat sequence start systems and methods for aircraft ejection seats.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Occupants of aircrafts may be various weights ranging from a relatively light weight individual to a relatively heavy individual, which may prevent a single amount of force of thrust to propel an occupant out an aircraft from being desirable.

SUMMARY

An aircraft ejection seat sequence system is disclosed herein. The aircraft ejection seat sequence system may comprise: a sequence controller; a sensor target; and a non-contact sensor in electrical communication with the sequence controller, the non-contact sensor configured to transmit a reference control signal to the sequence controller in response to sensing the sensor target.

In various embodiments, the aircraft ejection seat sequence system may further comprise an ejection seat, wherein the non-contact sensor is coupled to the ejection seat. The aircraft ejection seat sequence system may further comprise a rail structure comprising rails, wherein the sensor target is coupled to the rail. The non-contact sensor may be configured to sense the sensor target in response to the non-contact sensor being in close proximity to the sensor target during an ejection event. The non-contact sensor may comprise a proximity sensor. The proximity sensor may be one of an inductive proximity sensor, a capacitive proximity sensor, an infrared proximity sensor, and an acoustic proximity sensor. The non-contact sensor may be a radio-frequency identification (RFID) reader. The aircraft ejection seat sequence system may further comprise a sensor, wherein the sequence controller is configured to determine a sequence of ejection events to perform in response to the reference control signal and a variable determined from the sensor.

An aircraft ejection system is disclosed herein. The aircraft ejection system may comprise: a rail structure fixedly coupled to an aircraft, the rail structure including rails; an ejection seat slidingly coupled to the rail structure and configured to transverse vertically along the rails during an ejection event; a non-contact sensor coupled to the ejection seat; and a sensor target coupled to the rail structure, the non-contact sensor configured to generate a reference control signal in response to sensing the non-contact sensor during the ejection event.

In various embodiments, the aircraft ejection system may further comprise a sequence controller in electrical communication with the non-contact sensor. The sequence controller may be in electrical communication with a sensor. The sequence controller may be operable to: receive the reference control signal from the non-contact sensor; receive a variable determination from the sensor; and command a sequence of ejection events based on the variable determination and the reference control signal. The non-contact sensor may comprise a proximity sensor. The proximity sensor may be one of an inductive proximity sensor, a capacitive proximity sensor, an infrared proximity sensor, and an acoustic proximity sensor. The non-contact sensor may be a radio-frequency identification (RFID) reader.

A control system for an ejection seat is disclosed herein. The control system may comprise: a sequence controller; at least one sensor in electrical communication with the sequence controller, the at least one sensor configured to determine at least one of an altitude, an airspeed, or an acceleration of the ejection seat during an ejection event; and a non-contact sensor in electrical communication with the sequence controller, the non-contact sensor configured to transmit a reference control signal to the sequence controller in response to sensing a sensor target between 1/64 inches (0.04 cm) and 1 inch (2.54 cm) from the non-contact sensor.

In various embodiments, the sequence controller is configured to command a sequence of ejection events based on a variable determination from the at least one sensor and the reference control signal from the non-contact sensor. The non-contact sensor may be a proximity sensor. The proximity sensor may be one of an inductive proximity sensor, a capacitive proximity sensor, an infrared proximity sensor, and an acoustic proximity sensor. The non-contact sensor may be a radio-frequency identification (RFID) reader.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

An ejection seat sequence system for use in an aircraft ejection system is disclosed herein. The ejection seat sequence system comprises a sequence controller, a sequence power source, a non-contact sensor, and a sensor target. In various embodiments, the non-contact sensor comprises a proximity switch, an RFID reader, or the like. In various embodiments, the ejection seat sequence system is configured for a non-contact, electronic, sequence initiation during an ejection event from an aircraft. In various embodiments, the ejection seat sequence system is configured to provide a repeatable reference point to the sequence controller of the aircraft ejection system. In various embodiments, the ejection seat sequence system may provide a more consistent reference point relative to typical mechanical ejection seat sequence systems.

Figure 1:
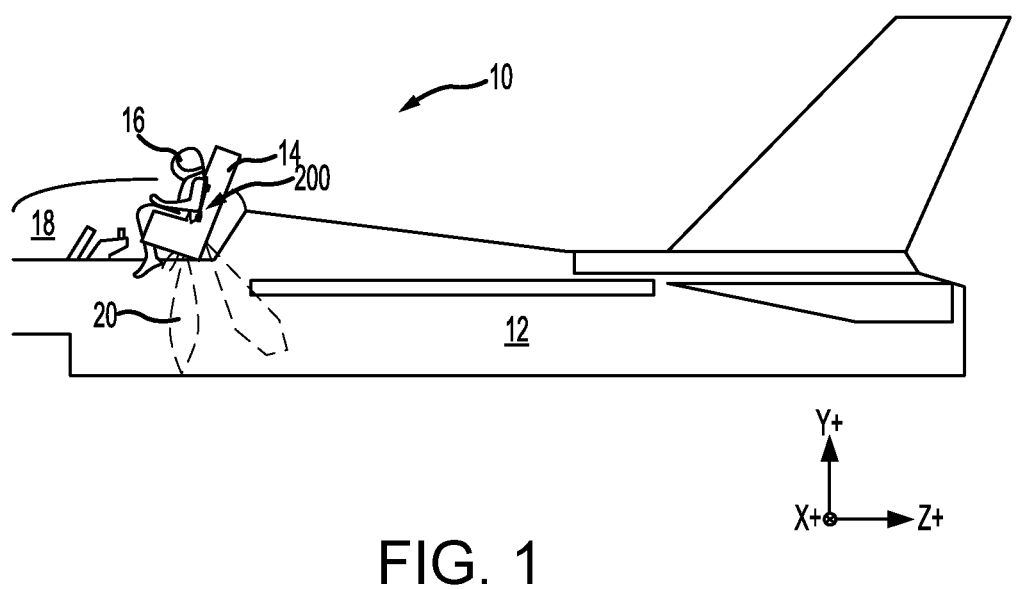
FIG. 1 illustrates an aircraft ejection system, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes an ejection seat sequence system 200. The ejection seat sequence system 200 may be configured to initiate a sequence of ejection events after the ejection seat has been expelled from the aircraft 12.

Figure 2:
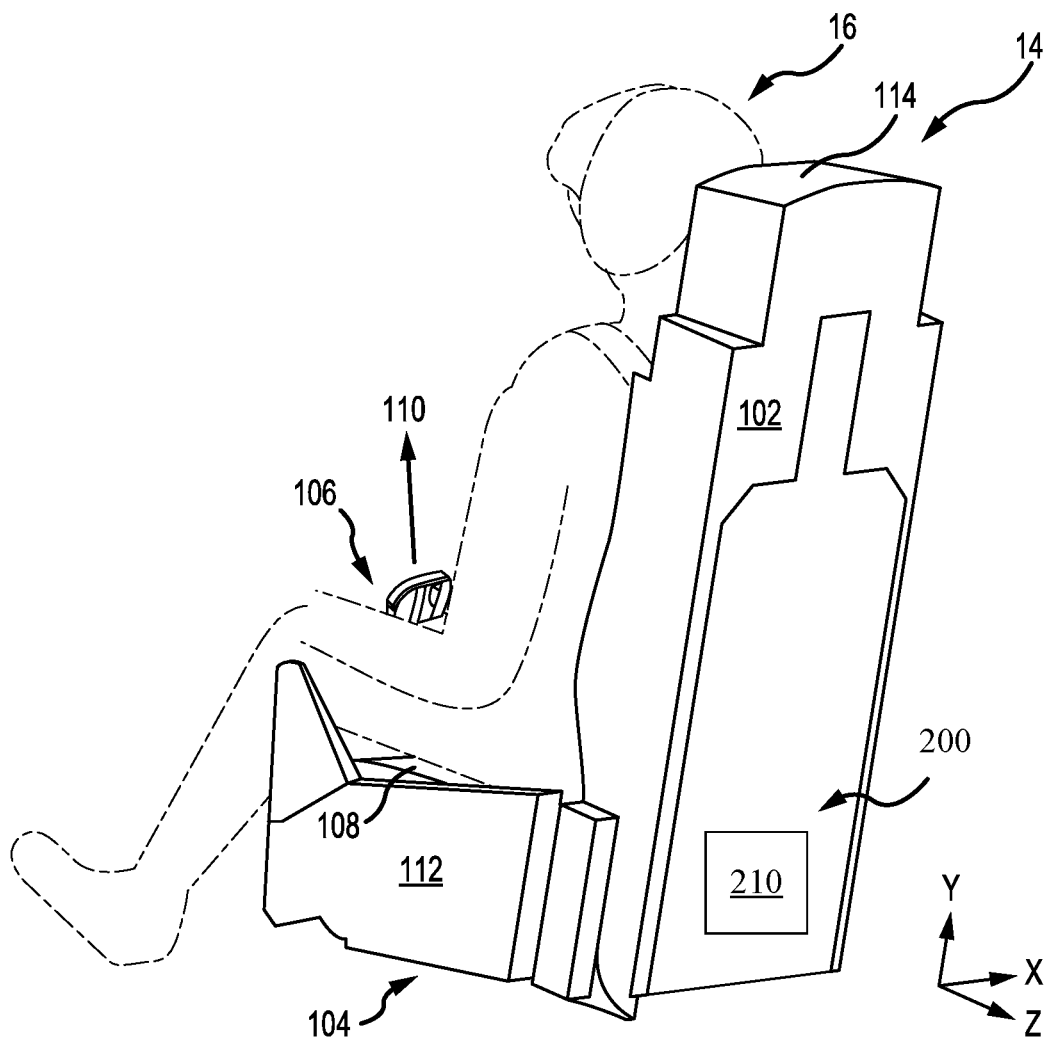
FIG. 2 illustrates an ejection seat having an ejection seat sequence system, in accordance with various embodiments.

With additional reference to FIG. 2, ejection seat 14 is illustrated with an ejection seat sequence system 200, in accordance with various embodiments. Ejection seat 14 includes a seat back 102 and a seat pan 104. The ejection seat sequence system 200 comprises a non-contact sensor 210 coupled to seat back 102. In various embodiments, an ejection handle 106 may be located proximate a front 108 of seat pan 104. Front 108 of seat pan 104 is generally opposite, or distal, seat back 102. While FIG. 2 shows ejection handle 106 located at front 108 of seat pan 104, it is further contemplated and understood that ejection handle 106 may be located anywhere that is accessible to an occupant of ejection seat 14. For example, ejection handle 106 may be located on a side 112 of seat pan 104 or a headrest 114 of seat back 102.

Ejection handle 106 may be configured to initiate an ejection sequence upon actuation. For example, occupant 16 pulling ejection handle 106 in the direction of arrow 110 may activate a rocket catapult assembly coupled to seat back 102 of the ejection seat 14. Ejection seat sequence system 200 may comprise a non-contact sensor 210. In response to activation, a catapult cartridge unit may ignite and tend to produce relatively hot, high pressure, gas. A breach may be coupled to the aircraft 12 and comprise a mortar tube disposed within the mortar assembly of the rocket catapult assembly. In various embodiments, the mortar cap assembly may direct a first portion of gas to the breach tending thereby to drive the mortar tube outward of the mortar assembly and cause ejection seat 14 to be expelled from cockpit 18. In various embodiments, upon ejection, the non-contact sensor 210 may translate past a sensor target. The sensor target may be disposed on a rail structure of the ejection seat system, or the like. In various embodiments, when the non-contact sensor 210 senses the sensor target, a reference start signal may be transmitted from the non-contact sensor 210 to a sequence controller disposed within the seat back 102 as described further herein.

Figure 3:
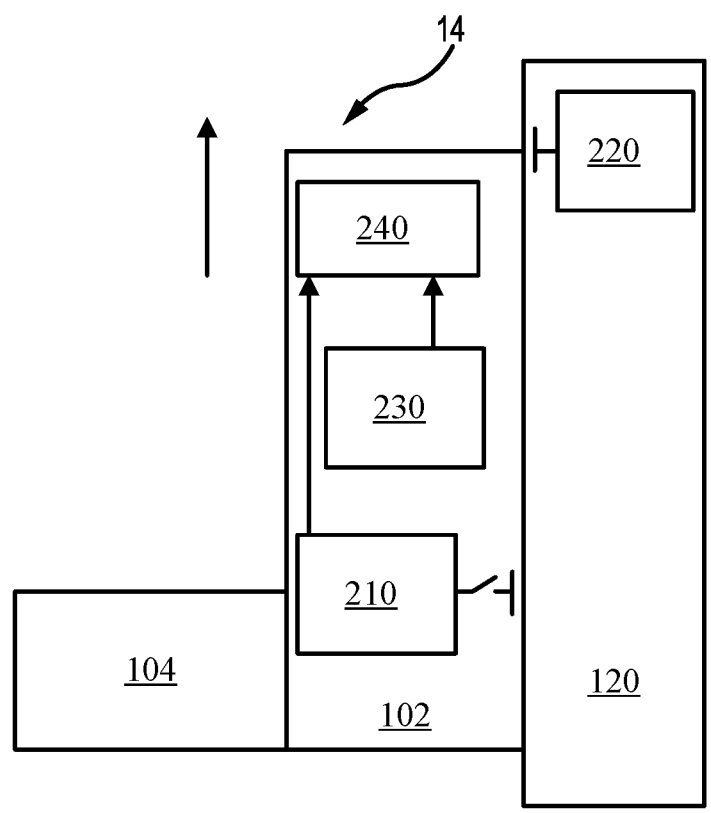
FIG. 3 illustrates a schematic view of an ejection seat sequence system, in accordance with various embodiments.

Referring now to FIG. 3, a schematic view of an ejection seat sequence system 200 for an aircraft ejection system 10, in accordance with various embodiments, is illustrated. In various embodiments, the aircraft ejection system 10 includes the ejection seat 14, having the seat pan 104 and the seat back 102, and a rail structure 120. The rail structure 120 is fixed to the aircraft 12 from FIGS. 1 and 2. The ejection seat 14 is configured to translate along the rail structure 120 during an ejection event, in accordance with various embodiments. For example, the seat back 102 may include tracks complimentary to rails of the rail structure 120, where the seat back is configured to translate vertically during an ejection event along the rails of the rail structure 120.

In various embodiments, the aircraft ejection system 10 includes an ejection seat sequence system 200. The ejection seat sequence system 200 may comprise a non-contact sensor 210, a sensor target 220, a power source 230, and a sequence controller 240. In various embodiments, the non-contact sensor 210 may be disposed in the seat back 102 of the ejection seat 14. In various embodiments, the non-contact sensor 210 is a proximity switch. For example, in various embodiments, the non-contact sensor 210 may comprise an infrared proximity switch, an acoustic proximity switch, a capacitor proximity switch, or an inductive proximity switch. In various embodiments, the non-contact sensor 210 may include a radio-frequency identification (RFID) reader. In various embodiments, an ejection seat sequence system 200, as disclosed herein, may be more cost effective than typical ejection seat sequence systems by removing mechanical elements from typical ejection seat sequence system. In various embodiments, the ejection seat sequence system 200 may provide a more consistent and reliable reference signal to the sequence controller 240 during an ejection event.

In various embodiments, the sensor target 220 of the ejection seat sequence system 200 may remain fixed within the aircraft 12 from FIGS. 1 and 2 during an ejection event. For example, the sensor target 220 may be coupled to the rail structure 120 of the aircraft ejection system. In various embodiments, the sensor target 220 may be complimentary to the non-contact sensor 210. For example, when the non-contact sensor 210 is an inductive proximity sensor, the sensor target 220 may comprise a ferrous metal, such as ferrous steel, or a non-ferrous metal, such as aluminum, brass, copper, or the like. In various embodiments, a ferrous metal sensor target may provide greater sensing distance for an inductive proximity sensor. In various embodiments, when non-contact sensor 210 is an RFID reader, the sensor target 220 may comprise an RFID tag (e.g., a radio transponder, a radio receiver, and a radio transmitter).

In various embodiments, the non-contact sensor 210 may be configured to sense the sensor target 220 when the non-contact sensor is between 1/64 inches (0.04 cm) to 1 inch (2.54 cm) away from the sensor target.

In various embodiments, the sequence controller 240 of the ejection seat sequence system 200 is disposed within the ejection seat 14. The sequence controller is in electrical communication with the non-contact sensor 210 and the power source 230. In various embodiments, the sequence controller 240 is configured to initiate a sequence of ejection events in response to receiving a reference control signal from the non-contact sensor 210. For example, when the non-contact sensor 210 senses the sensor target 220 during an ejection event, the non-contact sensor may transmit a reference control signal to the sequence controller 240. In response to receiving the reference control signal, the sequence controller 240 may be configured to initiate a sequence of ejection events for the ejection seat 14 to conduct. For example, the sequence controller 240 may activate Vernier motors, yaw motors, man-seat separator systems, drogue parachute deployment, and/or main parachute deployment.

In various embodiments, an ejection seat sequence system 200 as disclosed herein may be more accurate, have fewer components, be more consistent relative to mechanical ejection seat sequence systems. In various embodiments, typical systems include a lever arm that swings closed when it hits a physical trigger that activates the mechanical switch. In various embodiments, variations in the lever arm and the physical trigger may result in variations in the reference signal being sent to the sequence controller.

Figure 4:
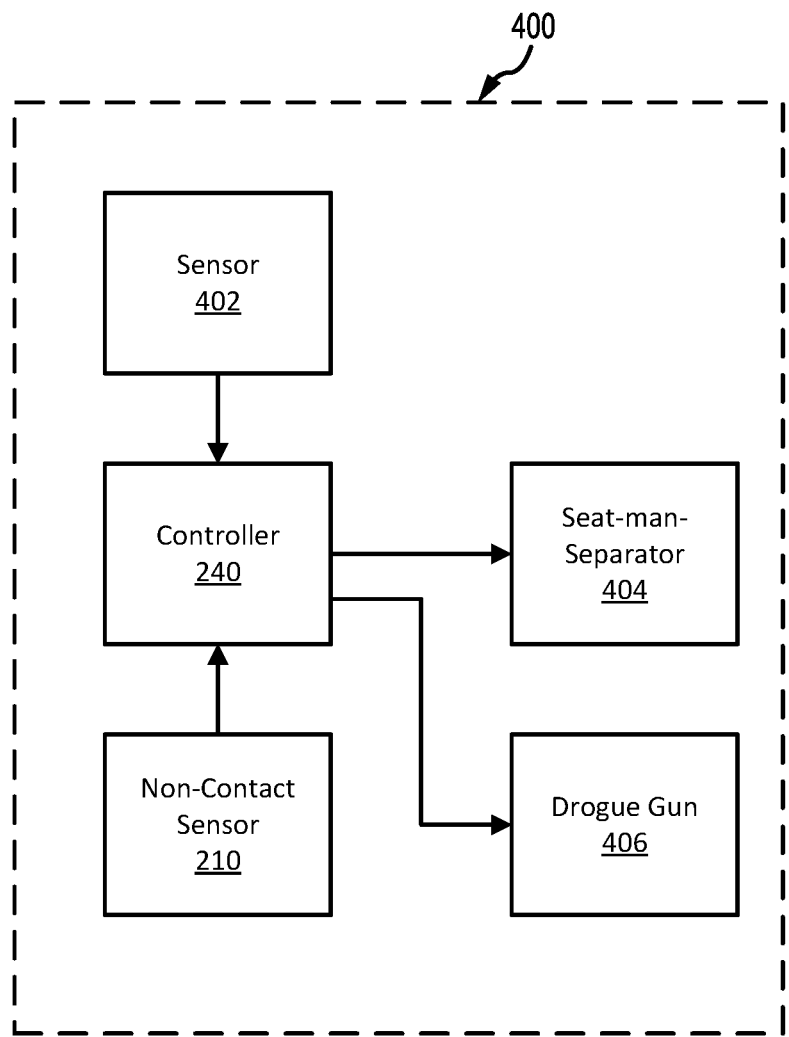
FIG. 4 illustrates a control system for an ejection seat sequence system, in accordance with various embodiments.

In various embodiments and with additional reference to FIG. 4, a schematic block diagram of a control system 400 for an aircraft ejection system 10. Control system 400 includes the sequence controller 240 in electronic communication with the non-contact sensor 210 and a sensor(s) 402. In various embodiments, sequence controller 240 may be integrated into computer systems of ejection seat 14. In various embodiments, sequence controller 240 may be configured as a central network element or hub to access various systems and components of control system 400. In various embodiments, sequence controller 240 may comprise a processor. In various embodiments, sequence controller 240 may be implemented in a single processor. In various embodiments, sequence controller 240 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Sequence controller 240 may comprise a processor configured to implement various logical operations in response to execution of instructions, for example, instructions stored on a non-transitory, tangible, computer-readable medium configured to communicate with sequence controller 240.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, sequence controller 240 may be in electronic communication with non-contact sensor 210 and sensor(s) 402. Non-contact sensor 210 may be disposed in seat back 102. Non-contact sensor may comprise any non-contact sensor, such as a proximity sensor, as disclosed herein, an RFID reader, or the like. The sensor(s) 402 may be any sensor known in the art, such as an altitude sensor (e.g., base/static pressure sensor), an airspeed sensor (e.g., dynamic/pitot pressure sensor(s)), an acceleration sensor (e.g., an accelerometer), or any combination of the aforementioned sensors. Based on the variable measured from the sensor(s) 402 and a reference control signal transmitted from the non-contact sensor, the sequence controller may initiate a sequence of ejection events.

In various embodiments, sequence controller 602 may receive a reference control signal from the non-contact sensor 210 in response to the non-contact sensor 210 sensing a sensor target (e.g., sensor target 220 from FIG. 3). In response to the reference control signal and based on at least one variable from the sensor(s) 402, the sequence controller 240 may command the seat-man-separator 404 to deploy after a period of time calculated based on the variable measurement from the sensor(s) 402 and determined from a point in time based on the reference control signal. Similarly, the sequence controller 240 may command the drogue gun 406 of the ejection seat to deploy a drogue parachute after a period of time, calculated based on the variable measurement, and determined from the point in time based on the reference control signal, in accordance with various embodiments. Although illustrated as including the seat-man separator 404 and the drogue gun 406, the present disclosure is not limited in this regard. For example, the control system 400 may further include a main parachute deployment, a stabilization system firing, a supplemental propulsion system firing, or any other ejection seat system known in the art.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft ejection seat sequence system, comprising:
   a sequence controller;
   a sensor target; and
   a non-contact sensor in electrical communication with the sequence controller, the non-contact sensor configured to transmit a reference control signal to the sequence controller in response to sensing the sensor target.

2. The aircraft ejection seat sequence system of claim 1, further comprising an ejection seat, wherein the non-contact sensor is coupled to the ejection seat.

3. The aircraft ejection seat sequence system of claim 2, further comprising a rail, wherein the sensor target is coupled to the rail.

4. The aircraft ejection seat sequence system of claim 1, wherein the non-contact sensor is configured to sense the sensor target in response to the non-contact sensor being in close proximity to the sensor target during an ejection event.

5. The aircraft ejection seat sequence system of claim 1, wherein the non-contact sensor comprises a proximity sensor.

6. The aircraft ejection seat sequence system of claim 5, wherein the proximity sensor is one of an inductive proximity sensor, a capacitive proximity sensor, an infrared proximity sensor, and an acoustic proximity sensor.

7. The aircraft ejection seat sequence system of claim 1, wherein the non-contact sensor is a radio-frequency identification (RFID) reader.

8. The aircraft ejection seat sequence system of claim 1, further comprising a sensor, wherein the sequence controller is configured to determine a sequence of ejection events to perform in response to the reference control signal and a variable determined from the sensor.

9. An aircraft ejection system, comprising:
   a rail structure fixedly coupled to an aircraft, the rail structure including rails;
   an ejection seat slidingly coupled to the rail structure and configured to transverse vertically along the rails during an ejection event;
   a non-contact sensor coupled to the ejection seat; and
   a sensor target coupled to the rail structure, the non-contact sensor configured to generate a reference control signal in response to sensing the non-contact sensor during the ejection event.

10. The aircraft ejection system of claim 9, further comprising a sequence controller in electrical communication with the non-contact sensor.

11. The aircraft ejection system of claim 10, wherein the sequence controller is in electrical communication with a sensor.

12. The aircraft ejection system of claim 11, wherein the sequence controller is operable to:
   receive the reference control signal from the non-contact sensor;
   receive a variable determination from the sensor; and
   command a sequence of ejection events based on the variable determination and the reference control signal.

13. The aircraft ejection system of claim 9, wherein the non-contact sensor comprises a proximity sensor.

14. The aircraft ejection system of claim 13, wherein the proximity sensor is one of an inductive proximity sensor, a capacitive proximity sensor, an infrared proximity sensor, and an acoustic proximity sensor.

15. The aircraft ejection system of claim 9, wherein the non-contact sensor is a radio-frequency identification (RFID) reader.

16. A control system for an ejection seat, the control system comprising:
   a sequence controller;
   at least one sensor in electrical communication with the sequence controller, the at least one sensor configured to determine at least one of an altitude, an airspeed, or acceleration of the ejection seat during an ejection event; and
   a non-contact sensor in electrical communication with the sequence controller, the non-contact sensor configured to transmit a reference control signal to the sequence controller in response to sensing a sensor target between 1/64 inches (0.04 cm) and 1 inch (2.54 cm) from the non-contact sensor.

17. The control system of claim 16, wherein the sequence controller is configured to command a sequence of ejection events based on a variable determination from the at least one sensor and the reference control signal from the non-contact sensor.

18. The control system of claim 16, wherein the non-contact sensor is a proximity sensor.

19. The control system of claim 18, wherein the proximity sensor is one of an inductive proximity sensor, a capacitive proximity sensor, an infrared proximity sensor, and an acoustic proximity sensor.

20. The control system of claim 16, wherein the non-contact sensor is a radio-frequency identification (RFID) reader.

* * * * *